United States Patent
Woodward

(10) Patent No.: US 7,024,396 B2
(45) Date of Patent: Apr. 4, 2006

(54) TRANSACTION SYSTEM AND METHOD OF CONDUCTING A POINT-OF-SALE TRANSACTION BETWEEN A MERCHANT AND A CONSUMER USING A WIRELESS PLATFORM

(75) Inventor: Sean Woodward, Waterloo (CA)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/732,652

(22) Filed: Dec. 10, 2003

(65) Prior Publication Data
US 2005/0131838 A1 Jun. 16, 2005

(51) Int. Cl.
G06F 17/00 (2006.01)

(52) U.S. Cl. .............. 705/71; 705/64; 705/75; 713/171

(58) Field of Classification Search ............ 705/50–52, 705/64, 34, 67, 26, 75, 27, 71; 713/200–202, 713/175–177, 171; 380/228
See application file for complete search history.

(56) References Cited

U.S. PATENT DOCUMENTS

| | | | |
|---|---|---|---|
| 5,221,838 A | | 6/1993 | Gutman et al. |
| 6,026,379 A | * | 2/2000 | Haller et al. ............ 705/34 |
| 6,212,634 B1 | * | 4/2001 | Geer et al. ............ 713/156 |
| 6,250,557 B1 | | 6/2001 | Forslund et al. |
| 6,270,011 B1 | * | 8/2001 | Gottfried ............ 235/379 |
| 6,938,019 B1 | * | 8/2005 | Uzo ............ 705/65 |
| 2002/0023215 A1 | | 2/2002 | Wang et al. |
| 2002/0038287 A1 | | 3/2002 | Villaret et al. |
| 2002/0046185 A1 | | 4/2002 | Villart et al. |
| 2002/0077993 A1 | | 6/2002 | Immonen et al. |
| 2002/0107755 A1 | | 8/2002 | Steed et al. |
| 2002/0143634 A1 | | 10/2002 | Kumar et al. |
| 2002/0143655 A1 | | 10/2002 | Elston et al. |
| 2002/0169719 A1 | | 11/2002 | Dively et al. |
| 2002/0179704 A1 | | 12/2002 | Deaton |
| 2003/0024979 A1 | | 2/2003 | Hansen et al. |

(Continued)

FOREIGN PATENT DOCUMENTS

EP 1 093 097 A2 4/2001

(Continued)

Primary Examiner—Elisca Pierre Eddy
(74) Attorney, Agent, or Firm—Michael Chan

(57) ABSTRACT

A transaction system is provided for a merchant and a consumer to conduct a point-of-sale (POS) transaction. The transaction system includes a host, a consumer transaction processor, and a merchant transaction processor. The host provides a merchant authorization key and a consumer authorization key which co-operates as a pair with the merchant authorization key. The consumer transaction server receives the consumer authorization key from the host, and communicates the consumer authorization key to a portable wireless client of the consumer to allow the consumer to send the consumer authorization key to a POS terminal of the merchant. The merchant transaction server receives the merchant authorization key from the host, and compares the merchant authorization key with the consumer authorization key when the consumer authorization key is received from the POS terminal of the merchant. A message is sent to the POS terminal of the merchant to indicate a successful transaction if the comparison of the keys reveals that the keys comprise a pair. As an example, the keys comprise a pair when the keys match. A message is sent to the POS terminal of the merchant to indicate a failed transaction if the comparison of the keys reveals that the keys do not comprise a pair.

13 Claims, 4 Drawing Sheets

U.S. PATENT DOCUMENTS

| | | | |
|---|---|---|---|
| 2003/0061170 A1* | 3/2003 | Uzo | 705/64 |
| 2003/0154139 A1 | 8/2003 | Woo | |
| 2004/0078328 A1* | 4/2004 | Talbert et al. | 705/40 |
| 2005/0131838 A1* | 6/2005 | Woodward | 705/71 |

FOREIGN PATENT DOCUMENTS

| | | |
|---|---|---|
| JP | 362128361 A * | 6/1987 |
| WO | WO 01/95546 A2 | 12/2001 |
| WO | WO 02/21354 A1 | 3/2002 |

* cited by examiner

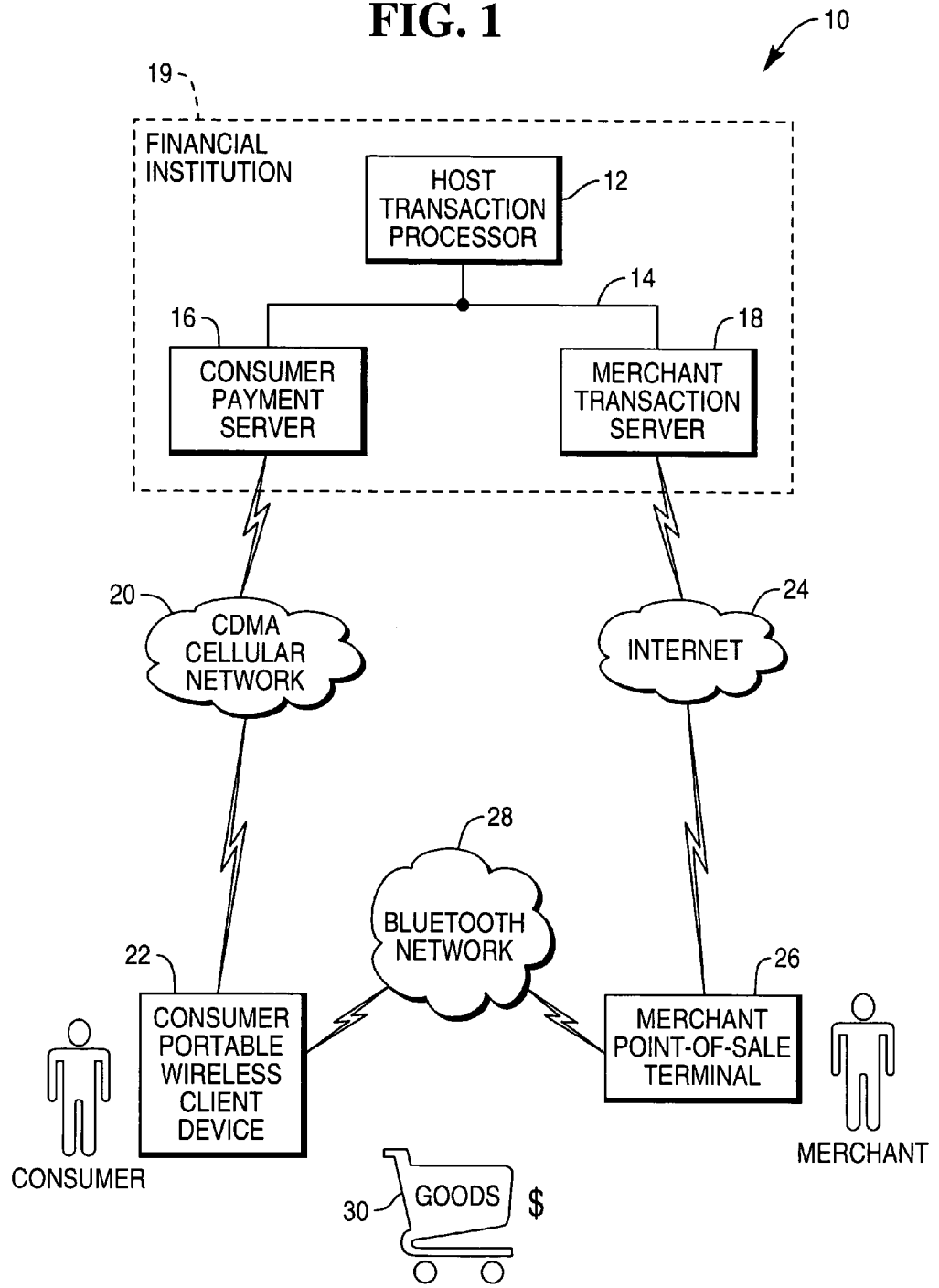

TRANSACTION SYSTEM AND METHOD OF CONDUCTING A POINT-OF-SALE TRANSACTION BETWEEN A MERCHANT AND A CONSUMER USING A WIRELESS PLATFORM

BACKGROUND OF THE INVENTION

The present invention relates to point-of-sale transactions, and is particularly directed to a transaction system and a method of conducting a point-of-sale transaction between a merchant and a consumer using a wireless platform.

The use of a wireless platform to conduct a point-of-sale (POS) transaction between a merchant and a consumer buying goods from the merchant is known. Typically, in the known wireless platforms, after wireless communication is established between the merchant and the consumer, the consumer provides the merchant with consumer-specific information so that the merchant can authenticate the transaction through an institution, such as a bank or a third party broker, to effect payment for the goods purchased by the consumer. When the merchant receives the consumer-specific information from the consumer, the merchant communicates with the institution to authenticate the transaction. The consumer-specific information provided by the consumer typically includes a person identification number (PIN), account details, and/or personal data, for examples.

A concern for some consumers in using the known wireless platforms to conduct a POS transaction is that these consumers may not feel secure when providing merchants with certain consumer-specific information. These consumers may be concerned about identity theft, for example. It would be desirable to provide a wireless platform on which a consumer can conduct a POS transaction with a merchant without having to disclose certain consumer-specific information to the merchant.

SUMMARY OF THE INVENTION

In accordance with one aspect of the present invention, a transaction system is provided for a merchant and a consumer to conduct a point-of-sale (POS) transaction. The transaction system comprises a host for providing a merchant authorization key and a consumer authorization key which co-operates as a pair with the merchant authorization key. The transaction system further comprises a consumer transaction server including (i) means for receiving the consumer authorization key from the host, and (ii) means for communicating the consumer authorization key to a portable wireless client of the consumer to allow the consumer to send the consumer authorization key to a POS terminal of the merchant. The transaction system also comprises a merchant transaction server including (i) means for receiving the merchant authorization key from the host, and (ii) means for comparing the merchant authorization key with the consumer authorization key when the consumer authorization key is received from the POS terminal of the merchant. The merchant transaction server may include means for sending a message to the POS terminal of the merchant to indicate a successful transaction if the comparison of the keys reveals that the keys comprise a pair. As an example, the keys comprise a pair when the keys match. The merchant transaction server may include means for sending a message to the POS terminal of the merchant to indicate a failed transaction if the comparison of the keys reveals that the keys do not comprise a pair.

In accordance with another aspect of the present invention, a method of operating a transaction system to enable a merchant having a POS terminal and a consumer having a portable wireless client to conduct a POS transaction comprises supplying a merchant authorization key and a consumer authorization key which co-operates as a pair with the merchant authorization key, transmitting the consumer authorization key to the portable wireless client device of the consumer, transmitting the consumer authorization key from the portable wireless client device of the consumer to the POS terminal of the merchant, and comparing the consumer authorization key with a merchant authorization key to determine if the keys comprise a pair after the consumer authorization key is received at the POS terminal of the merchant. As an example, the keys comprise a pair when the keys match.

In accordance with yet another aspect of the present invention, a point-of-sale (POS) terminal is provided for a merchant to conduct a POS transaction with a consumer. The POS terminal comprises means for wirelessly receiving a consumer authorization key from a portable wireless client device carried by the consumer, means for transmitting the consumer authorization key to a merchant transaction server located remotely from the POS terminal to compare the consumer authorization key with a merchant authorization key to determine if the keys comprise a pair, and means for receiving from the merchant transaction server a message indicating a successful transaction if the comparison reveals that the keys comprise a pair. As an example, the keys comprise a pair when the keys match. The POS terminal may further comprise means for receiving from the merchant transaction server a message indicating a failed transaction if the comparison reveals that the keys do not comprise a pair.

In accordance with still another aspect of the present invention, a method of operating a point-of-sale (POS) terminal in a POS transaction between a merchant having a point-of-sale terminal and a consumer having a portable wireless client device comprises wirelessly receiving a consumer authorization key from the portable wireless client device of the consumer, transmitting the consumer authorization key to a merchant transaction server located remotely from the POS terminal to compare the consumer authorization key with a merchant authorization key to determine if the keys comprise a pair, and receiving from the merchant transaction server a message indicating a successful transaction when the comparison of the keys reveals that the keys comprise a pair. As an example, the keys comprise a pair when the keys match. The method may further comprise receiving from the merchant transaction server a message indicating an unsuccessful transaction when the comparison of the keys reveals that the keys do not comprise a pair.

In accordance with another aspect of the present invention, a portable wireless client device is provided for a consumer to conduct a point-of-sale (POS) transaction with a merchant. The portable wireless client device comprises a wireless communication port for communicating with a POS terminal of the merchant, means for receiving a consumer authorization key from a consumer transaction server during the POS transaction, and means for transmitting the consumer authorization key to the POS terminal of the merchant when the consumer confirms sending of the consumer authorization key to the POS terminal of the merchant.

In accordance with yet another aspect of the present invention, a method of operating a portable wireless client device in a point-of-sale (POS) transaction between a consumer having a portable wireless client device and a merchant having a POS terminal comprises receiving a consumer authorization key from a consumer transaction server during the POS transaction, and wirelessly transmitting the consumer authorization key to the POS terminal of the merchant when the consumer confirms sending of the consumer authorization key to the POS terminal of the merchant.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic block diagram of a transaction system in accordance with the present invention.

DETAILS OF THE INVENTION

Figure 2A:
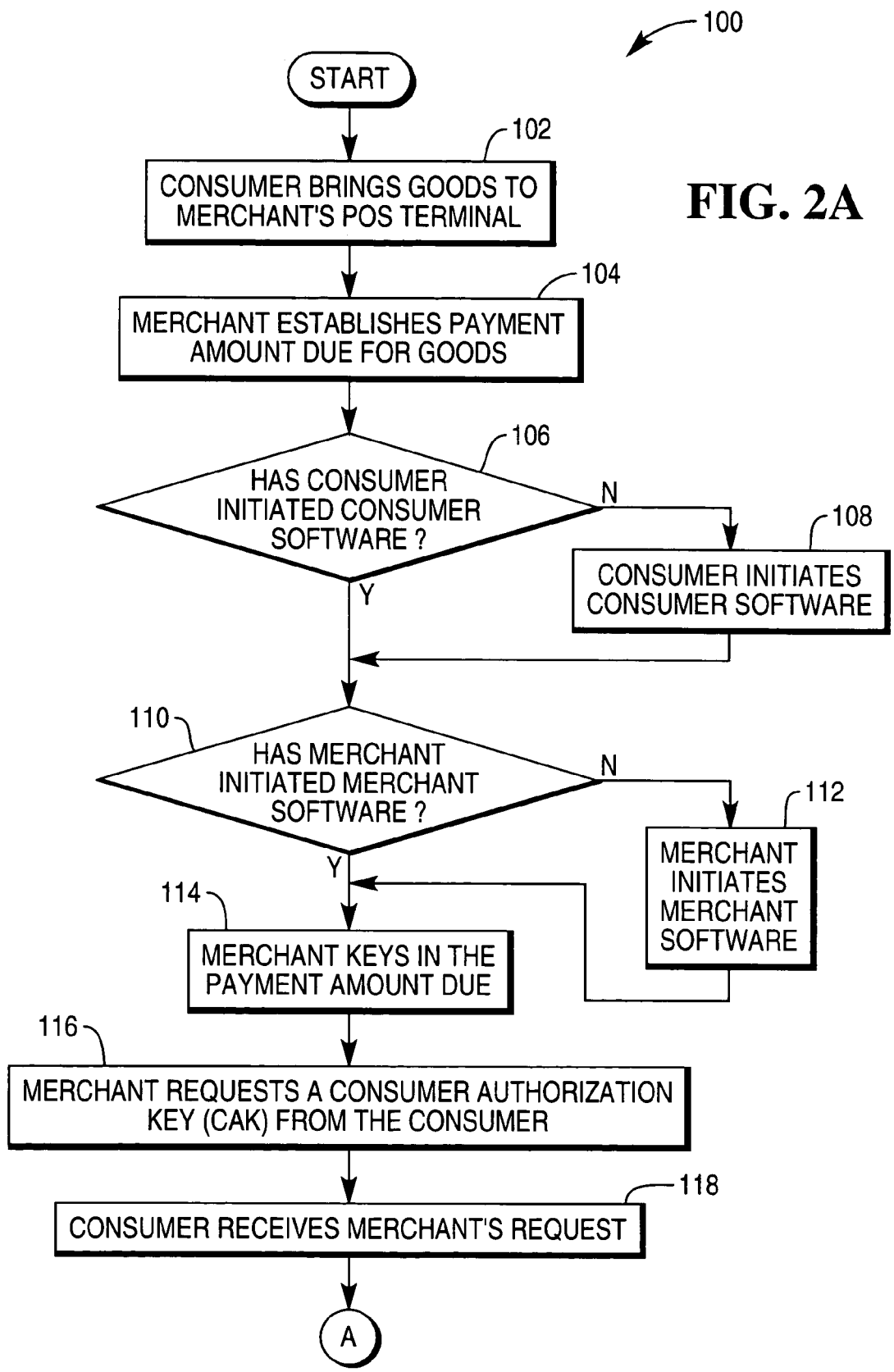
FIG. 2 is a flowchart depicting a process in accordance with the present invention.

The present invention is directed to a transaction system and a method of conducting a point-of-sale (POS) transaction between a merchant and a consumer using a wireless platform. The specific configuration of a transaction system in accordance with the present invention may vary.

Referring to FIG. 1, a transaction system 10 embodying the present invention includes a host transaction processor 12 which communicates on a network 14 with a consumer payment server 16 and a merchant transaction server 18. Although the host transaction processor 12 and the servers 16, 18 are shown in FIG. 1 as being at the same physical location, it is contemplated that each of the host transaction processor 12 and servers 16, 18 may be located at a different location. It is also contemplated that each of the host transaction processor 12 and servers 16, 18 may be owned by the same entity or by a different entity.

The consumer payment server 16 communicates via a cellular network 20, such as a code division multiple access (CDMA) cellular network, with a portable wireless client device 22 carried by a consumer. The portable wireless client device 22 is, preferably, in the form of a cellular phone. The cellular phone 22 is enabled for wireless communication using a known wireless platform. For example, the wireless platform may comprise Bluetooth (trademark) wireless technology offered by Bluetooth SIG, Inc. Suitable cellular phones for conducting POS transactions between a merchant and a consumer are known and, therefore, will not be described.

The merchant transaction server 18 communicates via a network 24, such as the Internet, with POS terminal 26 located at a facility of a merchant. The POS terminal 26 is enabled for wireless communication using a known wireless platform, such as Bluetooth (trademark) wireless technology. The POS terminal 26 wirelessly communicates via Bluetooth network 28 with the portable wireless client device 22 carried by the consumer.

Figure 2B:
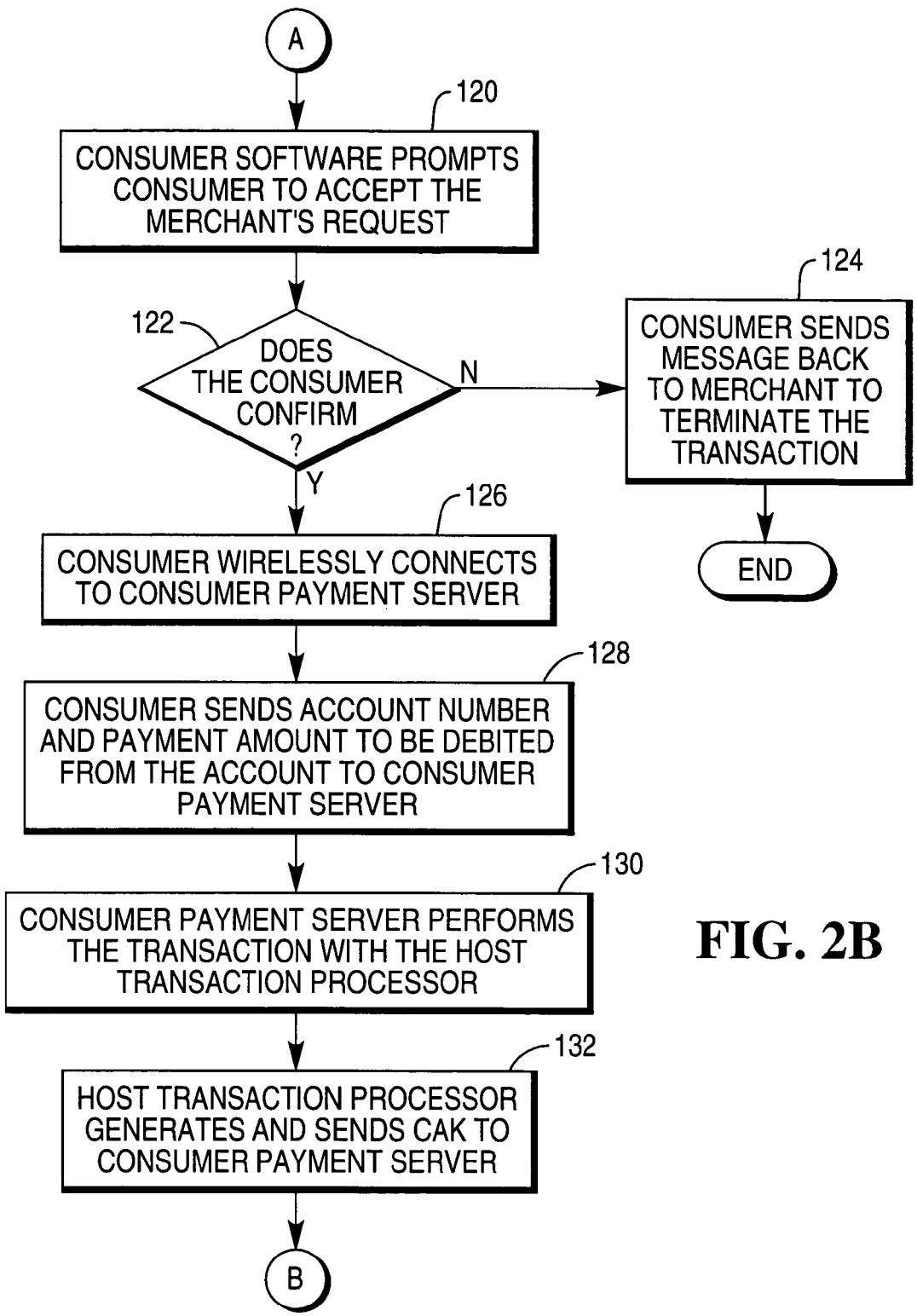
Figure 2C:
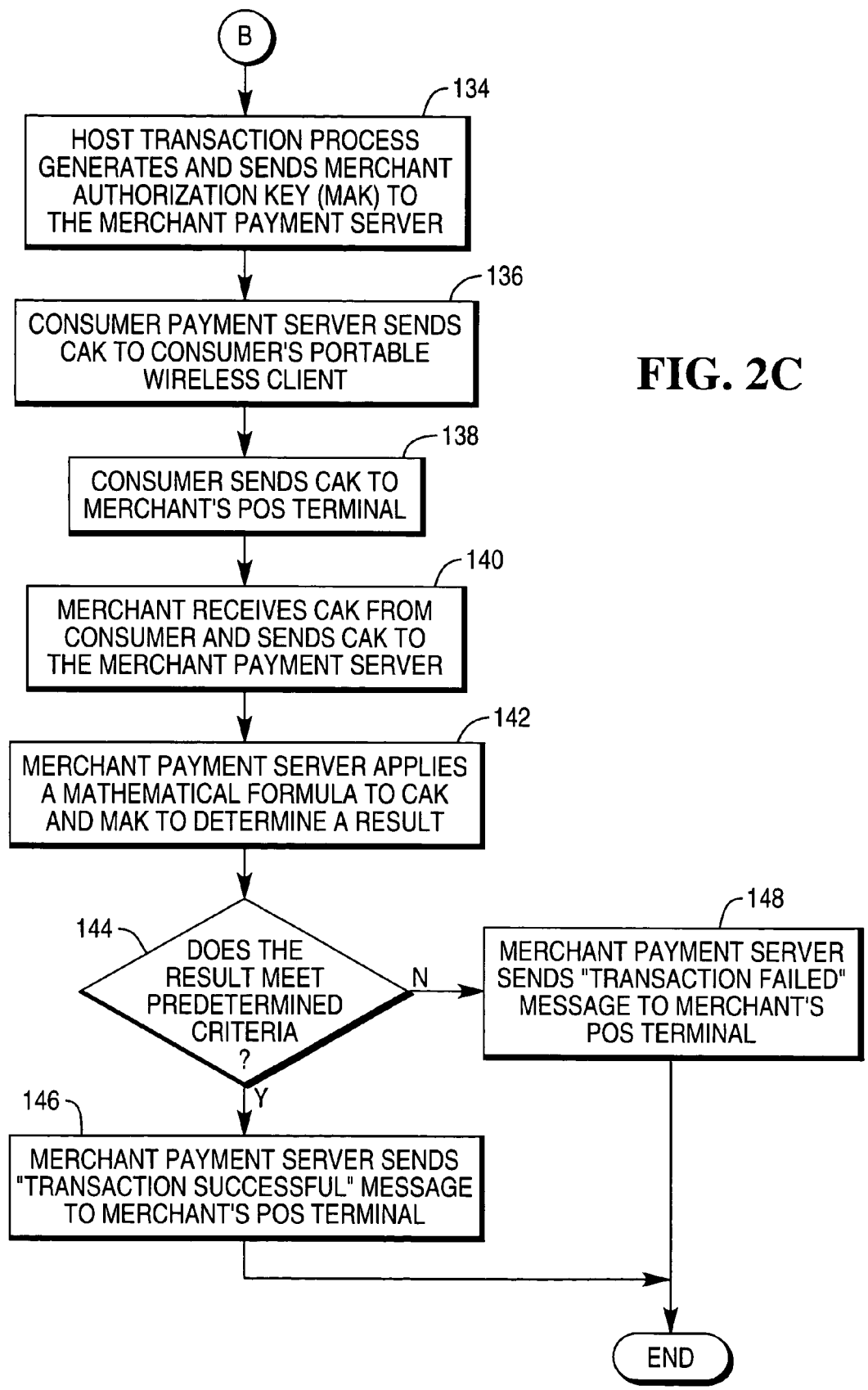

Referring to FIG. 2, a flowchart 100 depicts a process carried out by the transaction system 10 when a POS transaction is conducted between the merchant and the consumer. After the consumer brings goods 30 (FIG. 1) to be purchased to the POS terminal 26 of the merchant, as shown in step 102, the merchant establishes the amount of payment due for the goods, as shown in step 104. A determination is then made in step 106 as to whether the consumer transaction software on the portable wireless client device 22 carried by the consumer has been initiated. If the determination in step 106 is affirmative, the process proceeds to step 110. However, if the determination in step 106 is negative, the process proceeds to step 108 to initiate the consumer transaction software on the portable wireless client device 22 before proceeding to step 110.

A determination is made in step 110 as to whether the merchant transaction software on the POS terminal 26 of the merchant has been initiated. If the determination in step 110 is affirmative, the process proceeds to step 114. However, if the determination in step 110 is negative, the process proceeds to step 112 to initiate the merchant transaction software on the POS terminal 26 before proceeding to step 114. In step 114, the merchant keys in the payment amount due for the goods 30 to be purchased by the consumer, as was established in step 104. The merchant also requests a consumer authorization key (CAK) from the portable wireless client device 22 carried by the consumer, as shown in step 116.

When the merchant's request of step 116 is received by the portable wireless client device 22 carried by the consumer, as shown in step 118, the consumer transaction software on the portable wireless client device prompts the consumer to accept the merchant's request, as shown in step 120. The prompt may be in the form of displayed text on the portable wireless client device 22. A determination is made in step 122 as to whether the consumer confirms acceptance of the merchant's request. If the determination in step 122 is negative, the process proceeds to step 124 in which a message is sent back to the merchant to indicate to the merchant that the merchant's request has not been accepted. The transaction terminates as a result. However, if the determination in step 122 is affirmative (i.e., the consumer accepts the merchant's request), the process proceeds to step 126 in which the portable wireless client device 22 carried by the consumer wirelessly connects to the consumer payment server 16.

After the portable wireless client device 22 wirelessly connects to the consumer payment server 16, the account number of the consumer and the amount of money to be debited to this account number are sent from the portable wireless client device 22 to the consumer payment server 16, as shown in step 128. The consumer payment server 16 performs the transaction with the host transaction processor 12, as shown in step 130. Then in step 132, the host transaction processor 12 generates a CAK and sends the CAK to the consumer payment server 16. The host transaction processor 12 also generates a merchant authorization key (MAK) and sends the MAK to the merchant payment server 18, as shown in step 134.

After the consumer payment server 16 receives the CAK from the host transaction processor 12, the consumer payment server sends the CAK to the portable wireless client device 22 carried by the consumer, as shown in step 136. The consumer then sends the CAK from the portable wireless client device 22 to the POS terminal 26 of the merchant, as shown in step 138. In step 140, the POS terminal 26 receives the CAK from the portable wireless client device 22 of the consumer, and connects to the merchant payment server 18 to send the CAK thereto.

Then in step 142, the merchant payment server 18 receives the CAK from the POS terminal 26 of the merchant and applies a mathematical formula to the CAK and the MAK that was received from the host transaction processor 12 back in step 134 to provide a result. A determination is made in step 144 as to whether the result from the mathematical formula applied to the CAK and the MAK in step 142 meets predetermined criteria. The predetermined criteria may be, for example, whether or not the CAK and the MAK match. As an example, the extent of match may require an exact match between the CAK and the MAK. As an alternative, the extent of match may require a match only between at least some portion of the CAK and at least some portion of the MAK. This predetermined criteria may be stored in memory at the merchant payment server 18, for example.

If the determination in step 144 is affirmative, the process proceeds to step 146 in which a message is sent from the merchant payment server 18 to the POS terminal 26 of the merchant to provide an indication to the merchant that the transaction was successful. However, if the determination in step 144 is negative, the process proceeds to step 148 in which a message is sent from the merchant payment server 18 to the POS terminal 26 of the merchant to provide an indication to the merchant that the transaction failed (i.e., the transaction was unsuccessful).

A number of advantages result by providing a transaction system and method of conducting a POS transaction between a merchant and a consumer using a wireless platform in accordance with the present invention. One advantage is that the consumer is not required to provide consumer-specific information to the merchant in order to conduct the transaction. This helps to alleviate concerns or fears that the consumer may have in revealing certain consumer-specific information to a merchant during a POS transaction. The result is less potential for fraud to occur.

Although the above description describes the merchant as having a POS terminal which is located at a fixed location, it is contemplated that the POS terminal may comprise some other type of POS terminal. For example, the POS terminal may be a portable type of POS terminal. Also, although the above description describes using Bluetooth wireless technology for communication between a POS terminal of the merchant and a portable wireless client device carried by the consumer, it is conceivable that another type of wireless technology be used. For example, infrared technology may be used. Moreover, although the above description describes the consumer using a cellular phone as a portable wireless client device to conduct a POS transaction with a merchant, it is contemplated that the portable wireless client device may comprise a different type of device. For examples, the portable wireless client device may comprise a personal digital assistant (PDA), an Internet access device, or such like.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A transaction system for enabling a merchant and a consumer to conduct a point-of-sale (POS) transaction, the transaction system comprising:
   a host transaction processor for generating a merchant authorization key and a consumer authorization key which co-operates as a pair with the merchant authorization key;
   a consumer payment server including (i) means for receiving the consumer authorization key from the host transaction processor, and (ii) means for communicating the consumer authorization key to a portable wireless client device of the consumer to allow the consumer to send the consumer authorization key from the portable wireless client device to a POS terminal of the merchant; and
   a merchant transaction server including (i) means for receiving the merchant authorization key from the host transaction processor, (ii) means for receiving the consumer authorization key from the POS terminal of the merchant after the POS terminal of the merchant has received the consumer authorization key from the portable wireless client device of the consumer, and (iii) means for comparing the merchant authorization key with the consumer authorization key when the consumer authorization key is received from the POS terminal of the merchant.

2. A transaction system according to claim 1, wherein the merchant transaction server includes means for sending a message to the POS terminal of the merchant to indicate a successful POS transaction if the comparison of the keys reveals that the keys comprise a pair.

3. A transaction system according to claim 2, wherein the keys comprise a pair when the keys match.

4. A transaction system according to claim 1, wherein the merchant transaction server includes means for sending a message to the POS terminal of the merchant to indicate a failed POS transaction if the comparison of the keys reveals that the keys do not comprise a pair.

5. A transaction system according to claim 1, wherein the merchant transaction server includes (i) means for sending a message to the POS terminal of the merchant to indicate a successful POS transaction if the comparison of the keys reveals that the keys comprise a pair, and (ii) means for sending a message to the POS terminal of the merchant to indicate a failed POS transaction if the comparison of the keys reveals that the keys do not comprise a pair.

6. A method of operating a transaction system to enable a merchant having a POS terminal and a consumer having a portable wireless client device to conduct a POS transaction, the method comprising:
   generating a merchant authorization key and a consumer authorization key which co-operates as a pair with the merchant authorization key;
   transmitting the consumer authorization key to a consumer payment server;
   transmitting the merchant authorization key to a merchant transaction server;
   transmitting the consumer authorization key from the consumer payment server to the portable wireless client device of the consumer to allow the consumer to transmit the consumer authorization key from the portable wireless client device to the POS terminal of the merchant;
   receiving at the merchant transaction server the consumer authorization key from the POS terminal of the merchant after the POS terminal of the merchant has received the consumer authorization key from the portable wireless client device of the consumer; and
   comparing at the merchant transaction server the consumer authorization key with the merchant authorization key to determine if the keys comprise a pair after the consumer authorization key is received from the POS terminal of the merchant.

7. A method according to claim 6, wherein the keys comprise a pair when the keys match.

8. A point-of-sale (POS) terminal for a merchant to conduct a POS transaction with a consumer, the POS terminal comprising:

means for wirelessly receiving a consumer authorization key from a portable wireless client device carried by the consumer;

means for transmitting the consumer authorization key received from the portable wireless client device carried by the consumer to a merchant transaction server located remotely from the POS terminal to allow the merchant transaction server to compare the consumer authorization key with a merchant authorization key to determine if the keys comprise a pair; and means for receiving from the merchant transaction server a message indicating a successful POS transaction if the comparison at the merchant transaction server of the consumer authorization key with the merchant authorization key reveals that the keys comprise a pair.

9. A POS terminal according to claim 8, wherein the keys comprise a pair when the keys match.

10. A POS terminal according to claim 8, further comprising means for receiving from the merchant transaction server a message indicating a failed POS transaction if the comparison at the merchant transaction server of the consumer authorization key with the merchant authorization key reveals that the keys do not comprise a pair.

11. A method of operating a point-of-sale (POS) terminal in a POS transaction between a merchant having a POS terminal and a consumer having a portable wireless client device, the method comprising:

wirelessly receiving a consumer authorization key from the portable wireless client device of the consumer;

transmitting the consumer authorization key received from the portable wireless client device of the consumer to a merchant transaction server located remotely from the POS terminal to allow the merchant transaction server to compare the consumer authorization key with a merchant authorization key to determine if the keys comprise a pair; and receiving from the merchant transaction server a message indicating a successful POS transaction when the comparison at the merchant transaction server of the consumer authorization key with the merchant authorization key reveals that the keys comprise a pair.

12. A method according to claim 11, wherein the keys comprise a pair when the keys match.

13. A method according to claim 11, further comprising receiving from the merchant transaction server a message indicating an unsuccessful POS transaction when the comparison at the merchant transaction server of the consumer authorization key with the merchant authorization key reveals that the keys do not comprise a pair.

* * * * *